Patented Aug. 27, 1946

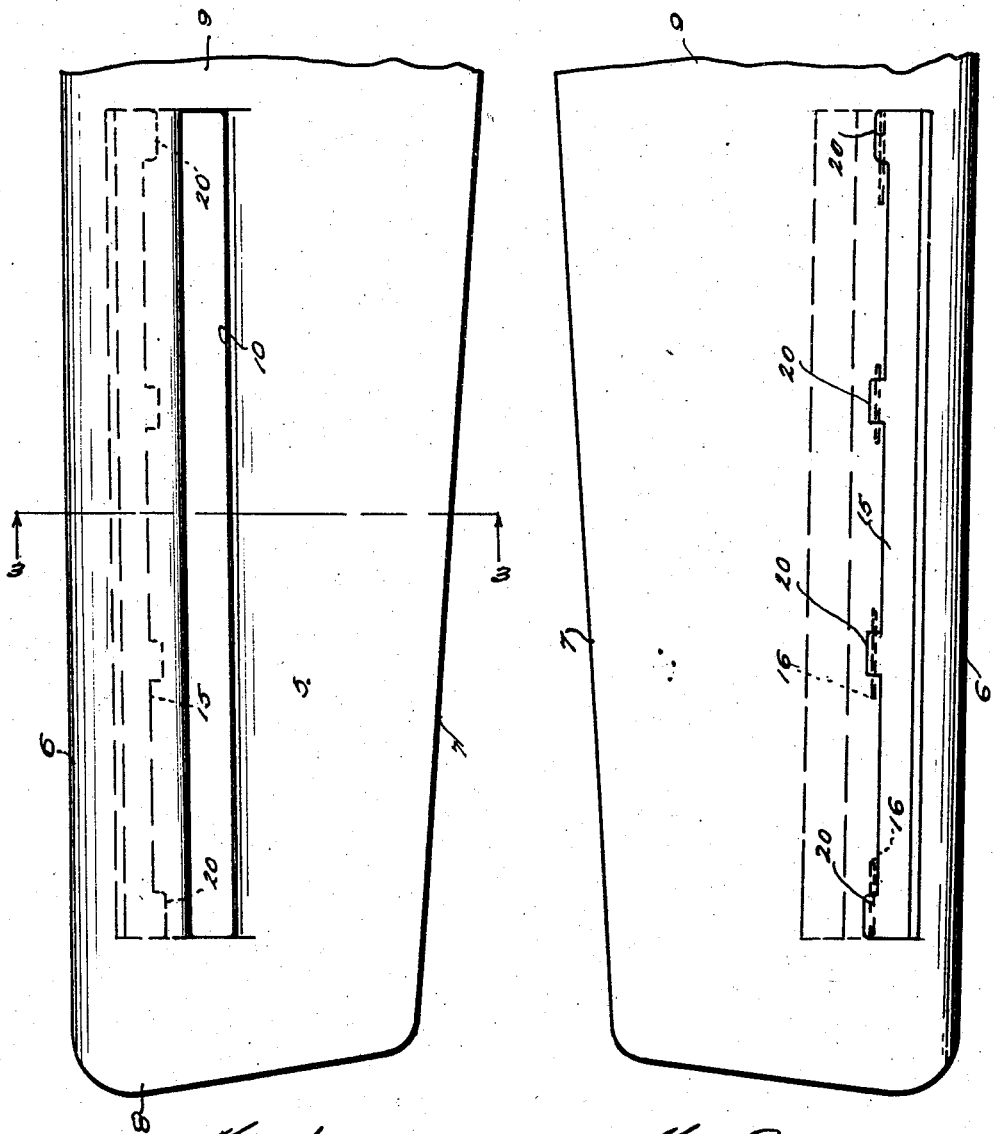

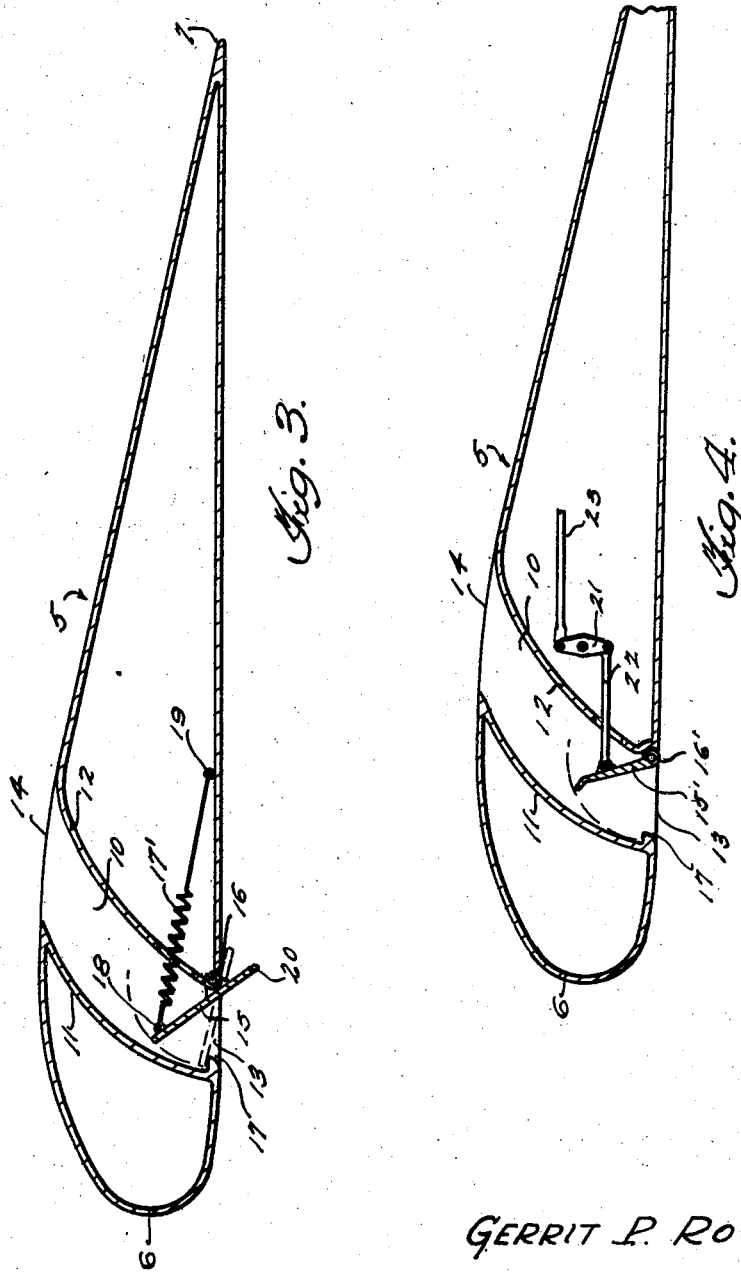

2,406,475

UNITED STATES PATENT OFFICE 2,406,475

SLOTTED AIRPLANE WING

Gerrit P. Rogers, Windsor, N. Y., assignor of one-fourth to Samuel H. Pearis, Binghamton, N. Y.

Application February 19, 1944, Serial No. 523,135

1 Claim. (Cl. 244—40)

This invention relates to airplane wings or airfoils having spanwise-extending slots therethrough near the leading edges thereof and/or at other points along the chord, and the primary object of the present invention is to provide an improved wing or airfoil of the above kind embodying novel means for controlling the slot and thereby varying the lift of the wing or airfoil.

An important object of the present invention is to provide slot-controlling means of the above kind, which is exceedingly simple in construction and highly efficient in operation.

A more specific object of the invention is to provide slot-controlling means of the above kind which is automatically operable by wind pressure for varying the lift of the wing or airfoil automatically in accordance with changes in the wind pressure.

Other objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a top plan view of an airplane wing or airfoil constructed in accordance with the present invention.

Figure 2 is a bottom plan view thereof.

Figure 3 is an enlarged transverse section taken on line 3—3 of Figure 1.

Figure 4 is a view similar to Figure 3 showing a modified form of the invention.

Referring in detail to the drawings, 5 indicates an airplane wing or airfoil of suitable or conventional shape, the leading edge being indicated at 6, the trailing edge at 7, the tip at 8, and the inboard end at 9. The wing or airfoil is provided near its leading edge 6 with a spanwise-extending slot 10 that extends upwardly and rearwardly through the wing or airfoil and has front and rear walls 11 and 12, respectively. Thus, the slot 10 has an entrance 13 at the bottom of the wing or airfoil and an exit 14 at the top of said wing or airfoil rearwardly of the entrance 13.

Referring to the form or embodiment of the invention shown in Figures 1 to 3, inclusive, a shutter 15 for controlling the slot 10 is provided at the entrance 13 of said slot, said shutter being pivoted, as at 16, along one longitudinal edge to the wing or airfoil at the juncture of the rear wall 12 of the slot 10 with the bottom of the airfoil or wing. The shutter 15 is thus mounted for vertical swinging movement within the lower end of slot 10, being movable upwardly to open position and downwardly to closed position. A suitable stop or ledge 17 is provided on the front wall 11 of slot 10 at the entrance 13 for limiting the downward swinging movement of shutter 15 to closed position, wherein the shutter is inclined slightly with its forward edge above the bottom of the wing or airfoil. A helical tension spring 17' is connected at one end to the free edge portion of the shutter 15, as at 18, and has its other end attached, as at 19, to the wing rearwardly of slot 10. This spring acts to normally yieldingly open the shutter 15, and wind-pressure operated means is provided for swinging the shutter 15 toward closed position against the action of spring 17. This wind-pressure operated means consists of fins 20 provided on the pivoted edge of shutter 15 and projecting below the bottom of the wing or airfoil coextensive with the shutter 15. Obviously, in accordance with variations of wind pressure against the fins 25, the position of the shutter 15 will be automatically changed to control or regulate the slot 10 and thereby automatically vary the lift of the wing or airfoil. While the construction illustrated involves a single elongated slot and a single controlling shutter therefor, it will be obvious that the slot and shutter may be divided to provide a plurality of shorter slots and separate controlling shutters therefor. However, as the invention lends itself particularly to construction involving a single elongated slot and a single controlling shutter for the slot, extreme simplicity of construction is provided for. By locating the shutter at the entrance of the slot and near the bottom or critical side of the wing or airfoil, a most efficient control is had.

Referring to the form or embodiment of Figure 4, the shutter 15' is pivoted along one longitudinal edge, as at 16', at the juncture of the rear wall of the slot 10 with the bottom of the wing or airfoil, but has no portion or fins projecting below the bottom of the airfoil or wing. This shutter is mounted to swing within the slot 10 exactly like the shutter 15 in Figure 3, and a similar spot or movement-limiting ledge 17 is provided for shutter 15'. In this embodiment, the shutter is adapted to be manually actuated by the pilot of the airplane for controlling the lift of the wing section or airfoil. For this purpose, a lever 21 may be pivoted in the wing or airfoil rearwardly of the slot 10 and a link 22 may connect the lower arm of lever 21 with the shutter 15', an operating rod 23 being connected to the other arm of lever 21 and extending rearwardly therefrom. By types of connections well known in the art, the rod 23 may be operable from the pilot's seat of the airplane so that a rearward pull on rod 23 will cause closing movement of the shutter 15' and forward movement of rod 23 will effect opening movement of said shutter 15'. In this way, the position of the shutter may be effectively manually regulated for controlling the slot 10 and varying the lift of the wing or airfoil. In this embodiment, the slot extends from near the inboard end of the wing to a point near the tip thereof and a single shutter is used so as to avoid the usual difficulty of closing multiple slots. In other respects, the device of Figure 4 is similar to that of Figure 3, and remaining parts are indicated by like reference characters in both views.

From the foregoing description, it is believed that the construction and operation, as well as the advantages of the present invention, will be readily understood and appreciated by those skilled in the art. Minor changes in details of construction illustrated and described may be resorted to, such as fairly fall within the spirit and scope of the invention as claimed.

What I claim as new is:

In an airplane, an airfoil having a spanwise upwardly and rearwardly extending passageway therethrough near its leading edge, said passageway having front and rear walls and providing an entrance at the bottom of the airfoil and an exit at the top thereof, a shutter for controlling said passageway pivoted along its rear edge to the rear wall of said passageway at said entrance and movable upwardly and rearwardly within the passageway to open position, a ledge on the front wall of said passageway at said entrance and engageable by the front edge portion of said shutter for limiting forward and downward swinging movement of the latter to closed position, and operating means for said shutter, said operating means including a tension spring connected to and acting to open the shutter, and short spaced fins fixed to the pivoted edge of and lying in a plane parallel with the shutter, said fins projecting rearwardly and downwardly below the airfoil when the shutter is open for being acted upon by wind pressure to close the shutter against the action of said spring.

GERRIT P. ROGERS.